S. GISSINGER.
Churn.
No. 41,429.
Patented Feb. 2, 1864.
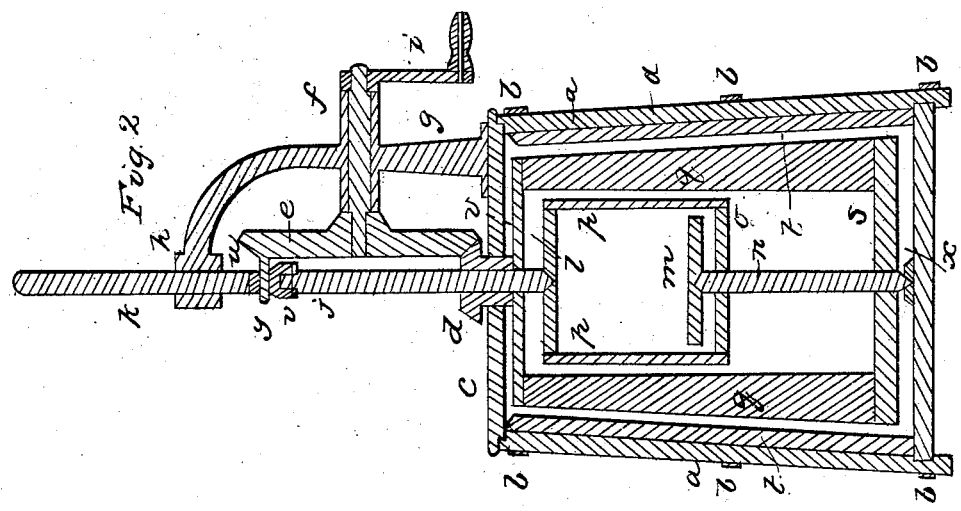
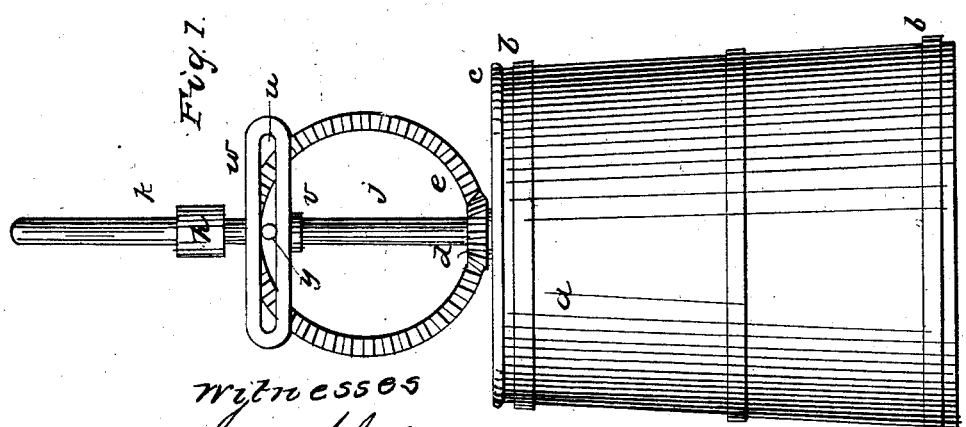
Witnesses
James J. Johnston
Alexander Hays
Inventor
Samuel Gissinger

UNITED STATES PATENT OFFICE.

SAMUEL GISSINGER, OF MANCHESTER, PENNSYLVANIA.

IMPROVEMENT IN CHURNS.

Specification forming part of Letters Patent No. 41,429, dated February 2, 1864.

*To all whom it may concern:*

Be it known that I, SAMUEL GISSINGER, of Manchester, in the county of Allegheny and State of Pennsylvania, have invented a new and Improved Churn; and I do hereby declare that the following is a full and exact description thereof, reference being had to the accompanying drawings, and to the letters of reference marked thereon.

The nature of my invention consists in an arrangement of wings, disk, breakers, and dashers, arranged, constructed, and operating in the manner hereinafter described.

To enable others skilled in the art to make and use my invention, I will proceed to describe its construction and operation.

In the accompanying drawings Figure 1 represents a side or face view of the churn. Fig. 2 represents a cut or sectional view of the same.

In the drawings, $a$ represents the body of the churn.

$b$ represents the hoops or bands.

$c$ represents the lid to which is attached the stand or support $g$ of the shaft $f$ and driving-wheel $e$. On the upper end of the stand or support $g$ is a guide, $h$, for the stem $k$ of the piece $w$, in which is a slot, $u$, in which is placed a pin, $y$, which is attached to the driving-wheel $e$. The lower side of the piece $w$ is furnished with a socket, $v$, in which is secured the upper end of the staff $j$ of the dashers $l$ and $o$, which are connected by means of the pieces $p$. The disk $m$ is attached to the stem $n$, which passes through an opening in the dasher $o$, and is secured to and in the cross-piece $s$ of the wings $q$. The lower end of the stem $n$ is fitted into a step, $S$, which is secured in the center of the bottom of the churn. The staff $j$ of the dashers $l$ and $o$ passes up through an opening made in the upper cross-bar, $r$, of the wings $q$, and also passes through an opening in the center of the pinion $d$, the hub of which is secured to the cross-bar $r$ by means of steady-pins or other device. $t$ represents the breakers, which are secured to the sides of the churn.

The manner of constructing the churn and its various parts will be readily understood by reference to the accompanying drawings, and by reference to the description of its operation, which is as follows: By turning the crank $i$ motion is imparted to the driving-wheel $e$, which will impart motion to the pinion $d$, which will impart a corresponding (revolving) motion to the wings $q$, disk $m$, and its stem $n$.

The pin $y$ in the slot $u$ of the piece $w$ will give to the dashers $l$ and $o$ an up-and-down or plunging motion. Thus, the milk and cream is thrown up and down against the revolving disk $m$ by the dashers $l$ and $o$, which will cause the milk or cream to be thrown out in currents against the sides of the churn, and the wings $q$ in sweeping around will strike these currents and throw the milk or cream against the breakers $t$, and thereby most effectually and thoroughly agitate and break up the milk or cream and produce butter in a very short time.

The size and form and manner of constructing the churn and its various parts I leave to the good judgment and skill of the mechanic.

Having thus described the nature, construction, and operation of my improvement, what I claim as of my invention is—

The combination and arrangement of the wings $q$, disk $m$, breakers $t$, and dashers $l$ and $o$, constructed, arranged, and operating in the manner and by the means herein described, and for the purpose set forth.

SAMUEL GISSINGER.

Witnesses:
JAMES J. JOHNSTON,
ALEXANDER HAYS.